No. 861,305. PATENTED JULY 30, 1907.
W. B. McFADDEN.
SCRAPER ATTACHMENT FOR ICE CREAM FREEZERS.
APPLICATION FILED JULY 11, 1906.
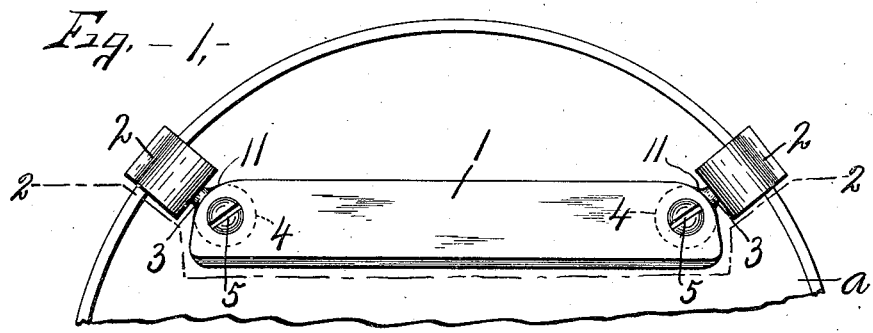
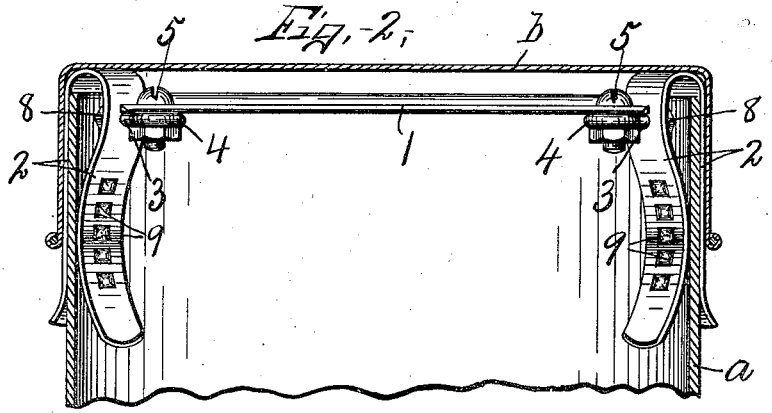
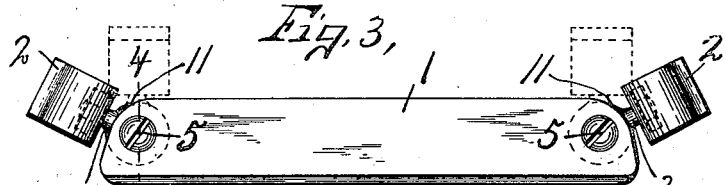
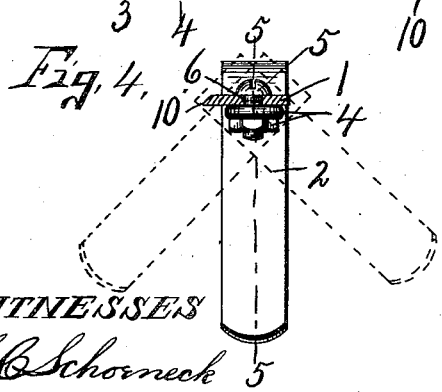
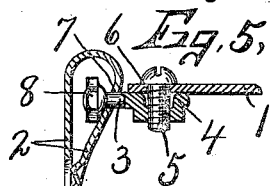
WITNESSES
CC Schorneck
H. E. Chase
INVENTOR
W. B. McFadden
BY
Howard P. Denison
ATTORNEY ic
UNITED STATES PATENT OFFICE.

WILLIAM B. McFADDEN, OF SYRACUSE, NEW YORK, ASSIGNOR TO MARY E. McFADDEN, OF SYRACUSE, NEW YORK.

SCRAPER ATTACHMENT FOR ICE-CREAM FREEZERS.

No. 861,305.             Specification of Letters Patent.           Patented July 30, 1907.

Application filed July 11, 1906. Serial No. 325,600.

*To all whom it may concern:*

Be it known that I, WILLIAM B. MCFADDEN, of Syracuse, in the county of Onondaga, in the State of New York, have invented new and useful Improvements in Scraper Attachments for Ice-Cream Freezers, of which the following, taken in connection with the accompanying drawings, is a full, clear, and exact description.

This invention relates to certain improvements in scraper attachments for ice cream receptacles, and is particularly useful in places where the ice cream is retailed in small quantities for soda water and small dishes.

It is customary to serve a predetermined quantity of this cream at a given price, and under existing methods, this quantity varies materially and is usually in excess of that which it is designed to supply, by reason of the fact that the ladle or other dish with which it is removed from the main receptacle is always more or less heaped, which of course, materially reduces the profit from the sales of the cream.

The main object, therefore, of my invention is to provide the main receptacle with a removable scraper attachment which is self-retaining and is of such construction as to permit the lid to be placed in operative position or removed without interfering with the attachment, and when the lid is off affords means against which the open side of the filled ladle or other dish may be drawn, to remove excess cream so that the same amount may be supplied to each customer.

Another object is to provide the scraper blade or bar with adjustable clamps which are adapted to swing horizontally and laterally to conform to different sizes and shapes of receptacles, upon which such attachment may be placed.

Other objects and uses will appear in the following description.

In the drawings, Figure 1 is a top plan of a portion of an ice cream receptacle and my improved scraper attachment mounted thereon. Fig. 2 is a sectional view taken on line 2—2 Fig. 1, a lower portion of the receptacle being broken away. Fig. 3 is a top plan of the scraper attachment seen in Figs. 1 and 2, showing the clamps in one position in full lines and in another position by dotted lines. Figs. 4 and 5 are sectional views taken respectively on lines 4—4 Fig. 3, and 5—5 Fig. 4.

In demonstrating the practicability of my invention I have shown a scraper attachment consisting essentially of a scraper bar —1— and clamps —2— which are adjustably secured to the opposite ends of the bar —1— and are adapted to slip over the upper edge, and to engage the inner and outer faces of an ice cream receptacle as —a—, having a lid —b— as best seen in Fig. —2—. These receptacles as —a— vary in diameter, some being straight or vertical, while others are flaring either downwardly or upwardly, and in order that the scraper attachment may be adapted to fit on the upper edges of such receptacles, the clamps —2— are adjustable relatively to the scraper bar —1—, and in the present instance are pivotally mounted at their upper ends upon suitable pins or studs —3— having threaded eyes —4— for receiving screws —5— which are journaled in apertures or bearings —6— in the ends of the bar —1—.

The pins —3— extend horizontally beyond the eyes —4— and adjacent ends of the bar —1—, through apertures —7— in the inner arms of the clamps —2—, and are provided with enlarged heads —8— located between said arms to prevent endwise displacement of the clamps from the pins or studs —3—. In other words, these pins —3— are pivotally connected to the ends of the plate —1— to swing horizontally and the clamps —2— are pivoted to the outer ends of the pins to swing laterally or vertically and by this relative association of the parts 1, 2—and—3, clamps —2— may be adjusted to fit upon the upper edge of any form or size of receptacle to hold the bar —1— rigidly within the upper end of said receptacle.

I have shown each clamp —2— as consisting of a one piece bar of spring metal bent upon itself forming opposite arms united at the top and having their lower edges, constituting spring jaws, spring tensioned toward each other but separable against their own spring tension, to receive the upper edge of the receptacle —a—.

The outer edge of the clamp —2— which engages the outer face of the receptacle —a— is preferably straight vertically, as best shown in Figs. 2 and 5, and being of comparatively thin spring metal does not interfere with the placing or removal of the lid as —b— to and from its operative position as clearly shown in Fig. 2.

The inner arm of each clamp —2— is preferably curved with its convex side toward the straight arm and may be formed with serrations —9— to afford greater gripping power.

The upper ends of the arms of each clamp —2—, just below their junction are spaced apart a sufficient distance to receive between them the enlarged head —8— of the pin or stud —3— so as to permit the clamp to turn freely upon said pin.

The exact form of the scraper bar —1— and clamps —2— is immaterial, the principle feature being to adjustably connect the clamps to the bar so that they may be adjusted horizontally and vertically to conform to different sizes and forms of receptacles as —a—.

The bar —1— is shown in the drawings as consisting of a blade having a knife edge —10— and rounded ends —11—, which latter, allows the clamps —2— to be placed close to the ends of the blade and at the same time to be turned or swung laterally upon their pivotal screws —5—.

The contiguous faces of the bar —1— and eyes —4— which engage each other, are substantially flat so that when the clamps are swung laterally or horizontally upon their pivots to the angles shown by full and dotted lines in Fig. 3, the blade will be rigidly held against turning in the bearings —7— of the clamps.

In placing this scraper attachment upon a receptacle, it is simply necessary to slide clamps 2 down over the upper edges of said receptacle until the scraper blade or bar —1— assumes a position within the main receptacle in a substantially horizontal position, as best seen in Figs. 1 and 2, the spring tension of the clamps serving to retain them, together with the blade or bar, in position, the outer arms of the clamps lying flatwise against the outer face of the receptacle —a—, to permit the lid —b— to be readily placed upon, or removed from said recepacle.

In using this device, supported in the manner described within the receptacle —a—, the scraper bar —1—, which is at one side of the center of the receptacle is directly in the path of the ladle with which the cream is withdrawn, so that the open side of the ladle may be easily and quickly drawn across the inner edge of the bar —1— to remove any excess of cream which may project beyond the open side of said ladle, thereby, enabling the attendant to supply a uniform amount of cream to each customer, and at the same time avoid excessive waste of such cream.

What I claim is:

1. A scraper attachment for ice cream receptacles consisting of a scraper bar and clamps pivoted to the ends of the scraper bar to swing horizontally to adapt said attachment for different sizes of receptacles.

2. An attachment for ice cream receptacles consisting of a scraper bar, horizontally swinging studs pivoted to the ends of the bar and clamps pivoted to said studs.

3. An attachment for ice cream receptacles consisting of a scraper bar, clamp supports hinged to the ends of the bar to swing horizontally and clamps hinged to said supports to swing vertically.

4. An attachment for ice cream receptacles consisting of a scraper bar, and spring clamps pivotally connected to the ends of the scraper bar to swing horizontally.

In witness whereof I have hereunto set my hand this 7th day of July 1906.

WILLIAM B. McFADDEN.

Witnesses:
H. E. CHASE,
CAROLINE M. McCORMACK.